(12) United States Patent
Gehring et al.

(10) Patent No.: US 7,798,077 B2
(45) Date of Patent: Sep. 21, 2010

(54) FREEFALL PYROLYTIC OVEN

(75) Inventors: Michael W. Gehring, Bakersfield, CA (US); William Sweet, Bakersfield, CA (US)

(73) Assignee: Simeken, Inc., Cypress, CA (US)

( * ) Notice: Subject to any disclaimer, the term of this patent is extended or adjusted under 35 U.S.C. 154(b) by 542 days.

(21) Appl. No.: 11/724,969

(22) Filed: Mar. 16, 2007

(65) Prior Publication Data
US 2008/0223268 A1   Sep. 18, 2008

(51) Int. Cl.
  F23J 1/02   (2006.01)
  F23B 10/00  (2006.01)
  F23B 80/00  (2006.01)
  F23G 5/00   (2006.01)

(52) U.S. Cl. .................... 110/229; 110/118; 110/165 R; 110/211; 110/257; 110/268

(58) Field of Classification Search ................. 110/229, 110/346, 235; 34/171, 165, 174, 168, 178; 432/129, 130, 132, 133; 202/124, 120, 130, 202/137
See application file for complete search history.

(56) References Cited

U.S. PATENT DOCUMENTS

| | | | | |
|---|---|---|---|---|
| 829,105 | A | * | 8/1906 | Doherty ........................ 48/203 |
| 1,766,132 | A | * | 6/1930 | Kraul ........................ 202/124 |
| 3,433,468 | A | * | 3/1969 | Schoenlaub ................. 432/130 |
| 4,122,036 | A | | 10/1978 | Lewis |
| 4,411,778 | A | * | 10/1983 | Venable ....................... 209/246 |
| 5,279,234 | A | | 1/1994 | Bender et al. |
| 5,411,714 | A | * | 5/1995 | Wu et al. ..................... 422/232 |
| 5,653,183 | A | * | 8/1997 | Hansen et al. .............. 110/346 |
| 5,806,441 | A | | 9/1998 | Chung |
| 5,901,653 | A | * | 5/1999 | Jennebach et al. .......... 110/213 |
| 6,358,042 | B1 | * | 3/2002 | Moriguchi .................. 432/227 |
| 6,941,879 | B2 | * | 9/2005 | Hahn et al. ................. 110/341 |
| 7,032,525 | B1 | | 4/2006 | Edmondson |
| 7,194,962 | B2 | * | 3/2007 | Edmondson ................ 110/230 |
| 2006/0278141 | A1 | | 12/2006 | Edmondson |

OTHER PUBLICATIONS

International Search Report issued Aug. 7, 2008, pp. 1-2.

* cited by examiner

*Primary Examiner*—Kenneth B Rinehart
*Assistant Examiner*—David J Laux
(74) *Attorney, Agent, or Firm*—Fulwider Patton LLP (57) ABSTRACT

A pyrolysis oven configured for vertical conveyance of material for incineration. The oven makes use of gravity and multiple plates to control the movement of material through the oven chamber. The plates and oven interior are heated in a low oxygen, pressurized environment to effect the decomposition of material as it freefalls down the chamber and makes contact with heated plates. The configuration and angle of declination of plates determines the freefall rate and retention time within the incinerating environment. The decomposition produces char and gas resultants, each of which are carried off through separate exits configured in the oven. The oven may be used as part of a waste management system in connection with a thermal oxidation chamber for the treatment of volatile organic compound gases that are a by-product of the pyrolytic process.

9 Claims, 7 Drawing Sheets

FREEFALL PYROLYTIC OVEN

BACKGROUND OF THE INVENTION

1. Field of the Invention

This invention relates to the field of industrial waste disposal ovens.

2. Description of the Prior Art

As the population increases, the necessity for developing waste management techniques increases in parallel. One dilemma facing modern day waste management facilities is the need to efficiently dispose of solid materials while simultaneously protecting the environment from the harmful by-products of the disposal process. This dilemma is exacerbated by the fact that many materials disposed of by the consuming public are not biodegradable and when submitted to waste managers, may not be simply buried and left for future generations to deal with. As history has shown, burying of non-biodegradable stockpiles does not prevent them or their byproducts from resurfacing and forming toxic waste pools and fumes at some point in the future.

A common disposal alternative to burying materials is incineration. One form of incineration involves heating material in the presence of oxygen until combustion occurs. Combusting most materials is effective in reducing the actual solid composition but is recognized as creating a different set of problems. Combustion contributes to air pollution in several gaseous forms. The by-products of combusted materials typically produce carbon dioxide which has been asserted to be a contributor to poor breathable air quality and the green house effect. The thickness of smoke produced has a visible effect on the quality of air in the vicinity of a waste incinerator. Non-biodegradable materials often expel noxious gases as well as large quantities of volatile organic compounds because of the prominent presence of oxygen. Volatile organic compounds, when uncontrolled in their management, quickly escape into the atmosphere as air pollutants and/or fall to earth becoming ground and water contaminants.

One common waste material whose decomposition has deleterious effects on the environment is vulcanized tire rubber. Typical American drivers can go through a set of four tires every two years equating to over 250 million tires disposed of each and a year. This is equivalent to nearly 4 million tons of rubberized material a year. Entire landfills and sections of garbage dumps are dedicated to the management of these items. Unfortunately, mounds of old rubber tires stacked several feet high become eyesores and occupy valuable space. The various adverse aspects of scrap tire disposal has led 33 states to ban whole tires from landfills while a dozen ban any form of scrap tires altogether. Where recycling of old rubber tires is economically unfeasible, incineration is the next best alternative. When burned, thick black plumes of obnoxious smoke and malodorous gases surround the area. The oxidized results are harmful to the air and ground they seep into. The lands used for tire burning are generally unusable for other purposes and may remain barren of vegetation for several years.

One technique that has proven effective in overcoming the deficiencies of oxygen feed combustion for waste material incineration is pyrolysis. Pyrolysis involves heating material sans the presence of oxygen or in an oxygen depleted environment. Chemical bonds are broken under pressure and operating temperatures typically above 800° F. Since the presence of oxygen is kept to a minimum, less gassing off occurs and less volatile organic compounds and smoke are produced. A majority of the material is converted to char while other by-products may include oils and syn-gas (the name given to gases of varying composition that are generated in the steam reforming of liquid hydrocarbons in some types of waste-to-energy gasification facilities) all of which can be energy rich and reused in other applications.

Most pyrolytic ovens use systems with numerous mechanical parts to move material through a heated passageway. A common example is a horizontal conveyor belt carrying shredded rubber tires through a long chamber. These ovens suffer from the deficiencies of any machine that includes several moving parts. Every additional part used is a potential point of breakdown for the oven. In a high temperature, pressurized environment, the small components of the system tend to fail or deteriorate frequently causing wasted time, extra labor for maintenance, replacement of parts and an extra overall expense. Coupling the need for many moving parts with the requirement that each component must function at very high temperatures means more expense is incurred in purchasing materials for constructing the oven.

One proposed solution uses an inclined chute oven where material is dropped onto a singular heated ramp and makes its way to an exit. A construction of this kind is seen in U.S. Pat. No. 7,032,525 to Edmondson. Ovens of this configuration lack flexibility in altering the movement rate and retention time of material and are susceptible to char buildup at the ramp's end when material is insufficiently incinerated. Ovens of this configuration also appear to lack flexibility in the control of heat exposure at various points of material freefall.

It can be seen then that a need exists for a more reliable pyrolytic oven capable of adjusting the retention time and heat exchange efficiency of material for sufficient thermal conversion while safely dispatching hydrocarbon gases.

SUMMARY OF THE INVENTION

Briefly and in general terms, the present invention is directed to an oven configured to thermally convert material as it travels vertically through a reaction vessel. The oxygen content within the oven is preferably kept to a minimum to maintain a pyrolytic environment. The oven is constructed with an outer heating shell chamber encompassing an inner reaction vessel containing a plurality of heat transfer plates positioned to receive the waste material as it is dropped into the reaction vessel wherein it freefalls downwardly towards an exit.

A heat source is typically located within the heating shell and may consist of, for example, a burning gas. The gas may be pumped in and ignited upon entrance so that the resultant heat energy would expand through the chamber entering through ports in the reaction vessel wall along the way into the ends of the heat transfer plates.

The heat transfer plates are hollow and made from a heat conductive and resilient material to transfer the heat from the outer heating shell chamber to the plate surfaces. The heat entering the reaction vessel travels through the plate interiors heating the plate surfaces so that the waste material will be thermally converted as it travels downwardly through the oven. As the waste material freefalls, the heat transfer plates obstruct the material path causing the material to transfer from one plate to the next. The waste material will be heated to the conversion point through three means: 1) through conduction of the heated gasses to the plates as the gasses travel through the plate interiors, 2) through convection of the heated gasses to the material as the gasses enter the reaction vessel from the ends of the plates, and 3) through radiation of heat from the bottom sides of plates emitting heat energy to material on the next lower plate. The plates are attached to the reaction vessel wall angled with respect to the vessel floor and alternate tipping the left or right edge downward so that when material lands on one plate, it slides down and drops off to the next plate. The plates may be attached fixed to the reaction vessel walls or hinged to allow for adjustment of the plate angles to manipulate freefall time of the material. An exit hole is positioned underneath the last plate end for permitting the converted, charred material to exit the oven.

As the waste material converts, a resultant byproduct in the form of hydrocarbon gases may be generated. These gases are carried out of the inner chamber through a flue assisted by a pressure differential in the system. These hydrocarbon gases may be pumped out of the oven altogether or recycled back into the heating shell and used as fuel as a heat source.

The oven may also be used in conjunction with a thermal oxidation chamber to form a self-contained system for near 100% processing and recycling of waste products. The oxidation chamber would be set at a lower pressure setting than the oven to assist byproduct hydrocarbon gas in leaving the oven interior and travel into the oxidation chamber where combustion of gases occurs. The resulting heat by-product of the combusted gases may then be pumped out into the atmosphere or recycled back into the oven outer chamber as an auxiliary heat source.

Other features and advantages of the invention will become apparent from the following detailed description, taken in conjunction with the accompanying drawings which illustrate, by way of example, the features of the invention

DETAILED DESCRIPTION OF THE PREFERRED EMBODIMENTS

Processing waste material has been accomplished through various thermal techniques. One method receiving renewed attention and development is pyrolysis; thermal conversion in a near oxygen-depleted environment. Where prior pyrolysis ovens converted material by horizontally conveying the waste material through the oven on a conveyor system incorporating numerous moving parts, the instant oven design simplifies the process and improves the efficiency of conversion by taking advantage of gravity to move material into contact with heated plates in a counter current heat exchange environment. Depending on the type of material disposed, the rate of material retention and the amount of heat may be adjusted at various points along the material descent. For example, if the oven were used to convert tires, an operating temperature above 1,000° F. will convert approximately 95% of the material into char and gas. However, those skilled in the art will recognize that several different types of materials may be disposed of using this oven with or without a pyrolytic environment and the operating temperature will vary accordingly.

Figure 1:
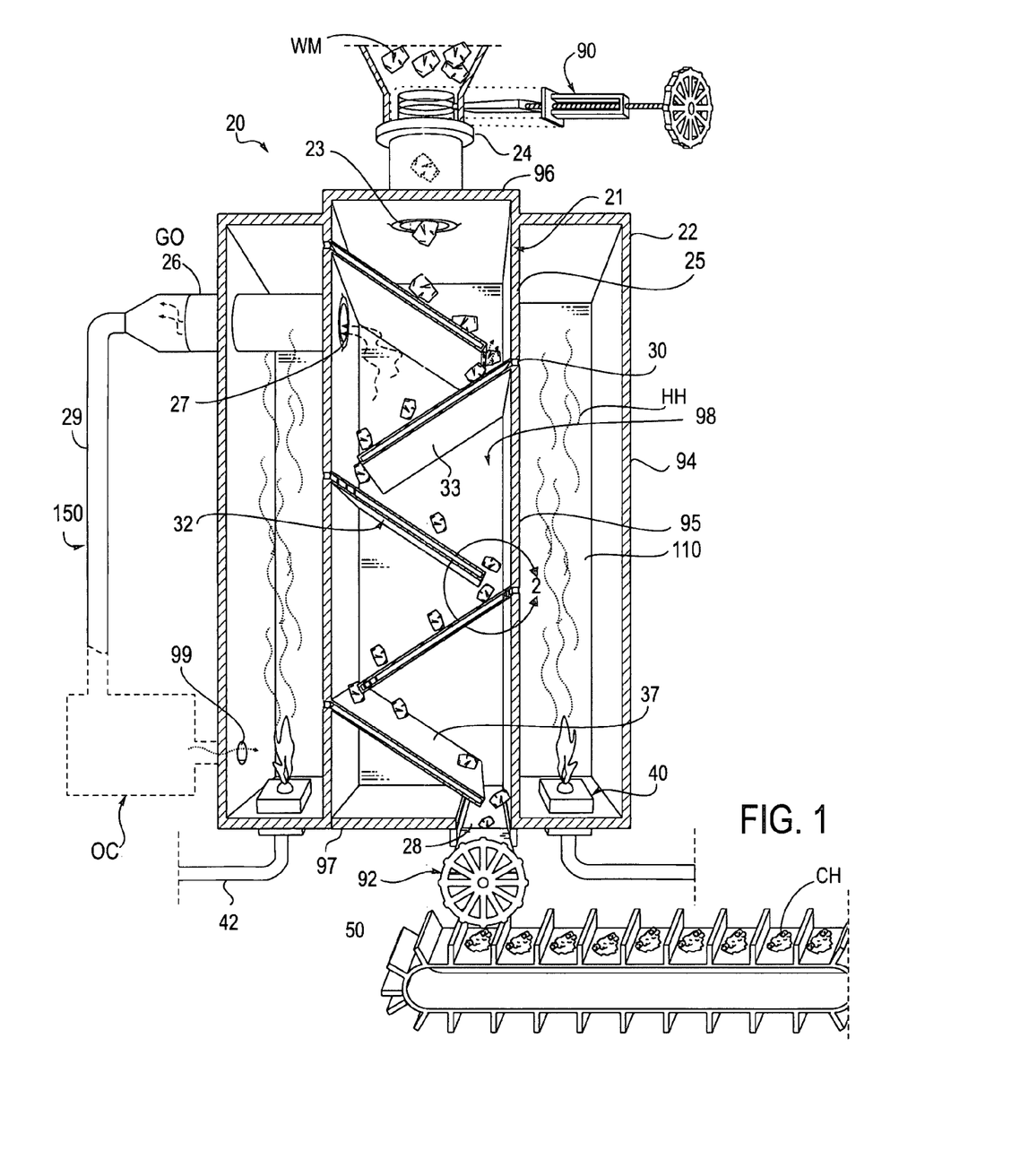
FIG. 1 is a frontal plan, sectional view of the freefall pyrolytic oven and system.

The freefall pyrolytic oven 20 shown in FIG. 1 for converting a waste material WM, includes a reaction vessel 21 within a heating shell 22, a feed inlet 24 positioned on the ceiling of the reaction vessel 21, a gas discharge conduit 26 disposed on the side reaction vessel walls, and a char material exit 28 on the floor 97. Heat transfer plates 32 are positioned within the reaction vessel 21. The heating shell includes a heat source 40 for generating and transferring heat energy HH into the reaction vessel 21 and heat transfer plates 32. Located adjacent to feed inlet 24 and char exit 28 respectively, are airlocks 90 and 92. Optionally, a waste material conveyor 50 may be positioned underneath the air lock 92.

The oven 20 of the present design includes a heating shell 22 which may be typically rectangular or cylindrical with wall surfaces 94 surrounding a generally rectangular reaction vessel 21 which includes a rear and front wall 98 (front wall not depicted), side walls 95, ceiling 96, and floor 97. Those of ordinary skill in the art will appreciate that a cavity 110 is formed all around the reaction vessel 21 and between the walls of the heating shell 22. Within the wall surfaces 94 a heat source 40 is positioned in the lower extremities of the heating shell 22 in connection with a fuel source line 42 feeding fuel to the heat source. As shown in FIG. 1, more than once heat source may be provided. It will be recognized that the heat source 40 may also be fueled by various fuels such as combustible gas, oil, diesel, or any liquid fuel, whose combustion, preferably results in a heated gas including a carbon monoxide component. Heat transfer plates 32 are mounted to the side walls 95 and the reaction vessel 21 and disposed to angle downwardly and inwardly therefrom in alternating overlapping succession. A gas outlet 27 is coupled to a gas discharge conduit 26 positioned on the side walls 95 with the conduit extending from the outlet 27 through the cavity 110 between the reaction vessel and heating shell and out through the surface walls of the heating shell. It will be recognized that the gas discharge conduit 26 may be constructed of any heat resilient material insulated on its exterior or from a mild steel with refractory blocks positioned inside the conduit. The gas discharge conduit 26 extends from the gas outlet 27 in operative connection to an oxidation chamber OC which includes a gas outlet means coupled to a gas inlet 99 positioned on the heating shell 22 surface walls 24.

Those of ordinary skill in the art will recognize that incineration ovens utilizing a pyrolytic system typically employ an airlock 90 in connection to a feed inlet 24 positioned at one extremity of the reaction vessel 21 in combination with an opening 23 to regulate the flow of waste material entering the reaction vessel as well as an airlock 92 positioned at the opposite end of the reaction vessel 21 in connection with an exit 28 to regulate the release of charred material CH. In addition, a conveyor system 50 is typically positioned beyond the exit 28 and airlock 92 for removal of charred material CH away from the oven 20.

Figure 2:
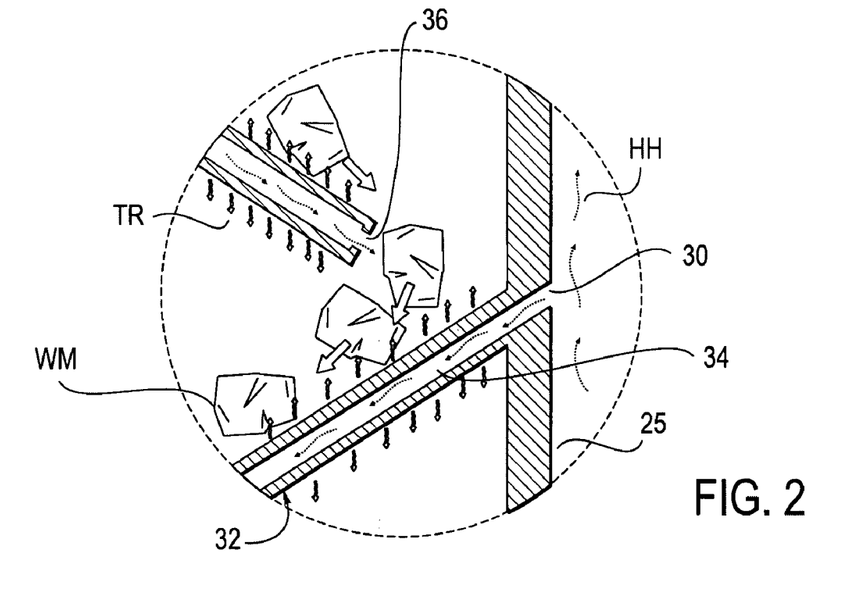
FIG. 2 is an enlarged detail view taken from the circle 2 in FIG. 1.
Figure 3:
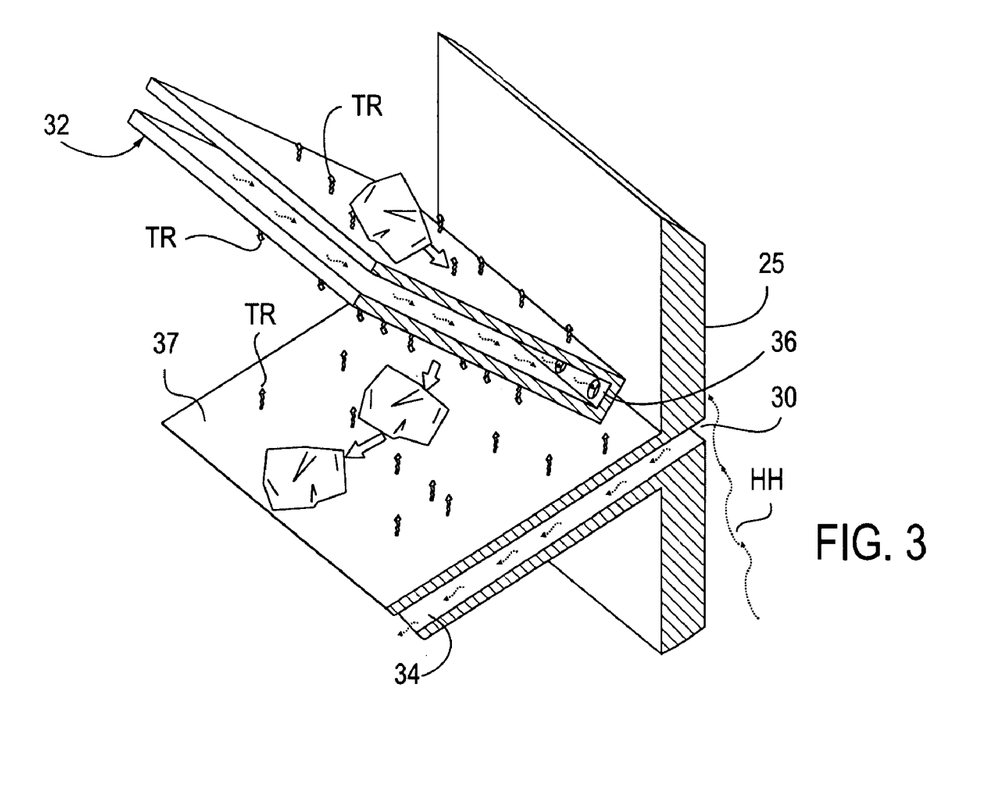
FIG. 3 is a perspective view similar to FIG. 2 showing the material path as it falls from plate to plate.

In a preferred embodiment, referring to FIGS. 1-3, the oven 20, as viewed from a front wall (not shown), includes heat transfer plates 32 mounted fixed to the side walls 95 of the reaction vessel 21. The side walls 95 further include thermal entry ports 30 positioned in offset heights between the left and right side walls 95. Heat transfer plates 32 are typically a rectangular, hollow construction with solid top surface 37, bottom 33, and side surfaces (not shown) defining a passageway 34 therein and include openings 36 on each plate end. However those of ordinary skill in the art will recognize that the plate end mounted to the surface 95 of the heating shell 22 may be configured to abut against whatever shape forms the sidewall 95. The mounted ends of heat transfer plates 32 are disposed to align the openings 36 with thermal energy ports 30. The plates may be constructed of any rigid, heat conductive material with a high melting point sufficient to operate in high temperature environments by way of example in excess of anywhere between 800° F. to 1800° F. with many applications generally performed within the 1000° F. to 1500° F. range. A contact surface 37 on the plate exterior may be formed smooth or modified to include a higher frictional surface such as ridges, steps, or a concaved slope to assist, in one regard to the movement rate of material. Where it is desired to increase retention time of the material within the reaction vessel 21, top surface 37 will be configured to have a higher coefficient of friction.

In operation, those skilled in the art will appreciate that the embodiment of the present invention is particularly suited for charring the waste material WM in high temperature environments and for controlling the exposure time of waste material within the reaction vessel. The heat source 40 located within the heating shell 22 gradually elevates the temperature of the heating shell 22 with a heated gas in ranges typically above 1000° F. and maintains the heating shell environment at a desired temperature. Those of ordinary skill in the art will appreciate that heated air within the heating shell 22 will rise towards the top extremities of the heating shell and encounter the thermal energy ports 30 on the side walls 95. It will be recognized that the interior of the reaction vessel 21 is cooler and in effect at a lower pressure than the cavity 110 formed between the surfaces 24 and side walls 95 creating a flow of heat energy HH through the thermal energy ports 30 into the heat transfer plates 32 where the heat energy HH will flow through the hollow passage 34 of the heat transfer plates 32 conducting heat into the plate surfaces and flow out through the plate openings 36 into the reaction vessel 21 interior. In this manner, the reaction vessel 21 will effectively reach an operating temperature near that of the heating shell 22 where it will be recognized that the heating shell is maintained at slightly higher temperatures because of a lag in heat transfer between the two sections and the transfer and absorption of heat energy by the waste material WM passing through.

It will also be appreciated that the vertical disposition of the oven 20 is particularly suitable for a continuous feed and pyrolysis of waste material WM. Waste material WM will be fed into the airlocks 90 and released into the inlet 24 in controlled fashion to freefall through the reaction vessel 21 interior. It will be appreciated that when waste material enters the reaction vessel 21, material will immediately encounter heated air sufficient for beginning the thermal conversion process and the process will be augmented when the waste material encounters a first heat transfer plate 32. It will recognized that heated carbon monoxide gases will react with any oxygen present in the oven promoting a pyrolytic environment. Freefalling waste material will then absorb heat from the surfaces of the heat transfer plates 32 and slide down falling off the free end of each freefalling to the top surface of the succeeding heat transfer plate. As the waste material makes its way through the interior of the reaction vessel, it will be appreciated that this arrangement provides exposure to multiple heat transfer plates as well as the heated ambient air of the reaction vessel and the thermal radiation TR given off by the lower plate surfaces (FIGS. 2 and 3) effectively exposing waste material to several sources of incineration.

It will also be appreciated that the oven 20 is especially conducive to providing improved heat transfer efficiency by facilitating a counter current heat exchange system. When operating the oven 20 in a counter current heat exchange system, the temperature of the heated waste material WM will increasingly approach the operating temperature of the oven the nearer the material is to the material exit 28 increasingly absorbing heat energy HH along its descent and maximizing the heat exchange transfer efficiency from the oven to the waste material. Those skilled in the art will appreciate that the oven features may be modified to manipulate the magnitude of heat exposure to free falling material at various heights of the oven so that as waste material WM begins its passage through the reaction vessel 21, the heat exchange between the heating shell 22 and reaction vessel may be controlled to provide more heat to the freefalling material the nearer the waste material converges to the material exit 28. For example, the size and number of thermal ports 30 leading in connection to the thermal plates 32 positioned near the feed inlet 23 may be less than those thermal ports 30 in connection to thermal plates 32 positioned near the material exit 28 thereby providing less conductive and convective area for heat energy HH to flow into the upper plates than the lower plates. It will also be recognized that providing more thermal plates 32 near the material exit 28 than near the feed inlet 24 may also subject the waste material WM to increasing heat exposure and transfer as the waste material descends relatively faster through the upper portions of the reaction vessel 21 absorbing less heated ambient air and contacting less plate top surfaces 37. The waste material WM gradually slows its descent as it lands on more plates rolling down more heated plate surfaces and is detained relatively longer in the heated ambient air the closer the waste material approaches the material exit 28. Those skilled in the art will also recognize that as the waste material contacts heated gases flowing upward counter current to the direction of the falling waste material, turbulence inside the reaction vessel 21 increases promoting increased material contact area with the surrounding heated air.

It will also be appreciated that the oven 20 is particularly suitable for combining with other waste processing equipment to provide a closed and efficient recycling system. As waste material entering the reaction vessel 21 begins charring, those of ordinary skill in the art will recognize that sometimes a resultant gas byproduct emanates from charring material. Some resultant gases must typically also be processed because they can be harmful to the environment. For example, one typical gas byproduct is hydrocarbon gas. Hydrocarbon gases are one form of volatile organic compounds that are a known environmental pollutant that quickly escape into the atmosphere contaminating the air, ground, and water if not managed quickly. As depicted in FIG. 1, the oven 20 may be connected in operation with an oxidation chamber OC. The heated gas off GO, rises up through the reaction vessel 21 encountering the gas outlet 27 drawn to the cooler and, in effect, lower pressure area created within the conduit 26 located outside the heating shell 22. One or more induced draft fan(s) 150 positioned outside the oven 20 in operative connection with the gas conduit 26 will create a pressure drop behind the fan assisting inducement of the gas off GO to flow out from the reaction vessel 21. The gas-off GO may be ran through a combined cycle gas turbine set, condensed into oils, or combusted as a fuel source. When combusted, the gas-off GO will be drawn down the gas discharge conduit 26 to the discharge line 29 and oxidation chamber OC set in a lower pressure area in the reaction vessel 21 with the movement of the gas-off assisted once again by induced draft fans 150 connected to the discharge line 29 creating an area of reduced pressure behind the fan into the oxidation chamber. Upon entering the thermal oxidation chamber OC, the gas-off GO will be burned and converted to environmentally friendly by-products and heat energy. The thermal oxidizing chamber OC may use any suitable burning mechanism including the cyclonic burner basket design, disclosed in pending U.S. patent application Ser. No. 11/415,297 which is assigned to the same assignee as this application. The heat from the burned gases may then be expelled into the environment via a heat discharge pump or as depicted in FIG. 1, the system may configure the oxidation chamber OC to assist as a heat source directing the oxidation chamber heat discharge back into the oven 20, in effect recycling both the gas by-products and heat discharge as an augmentation to the heat source 40 of the oven 20.

Figure 4:
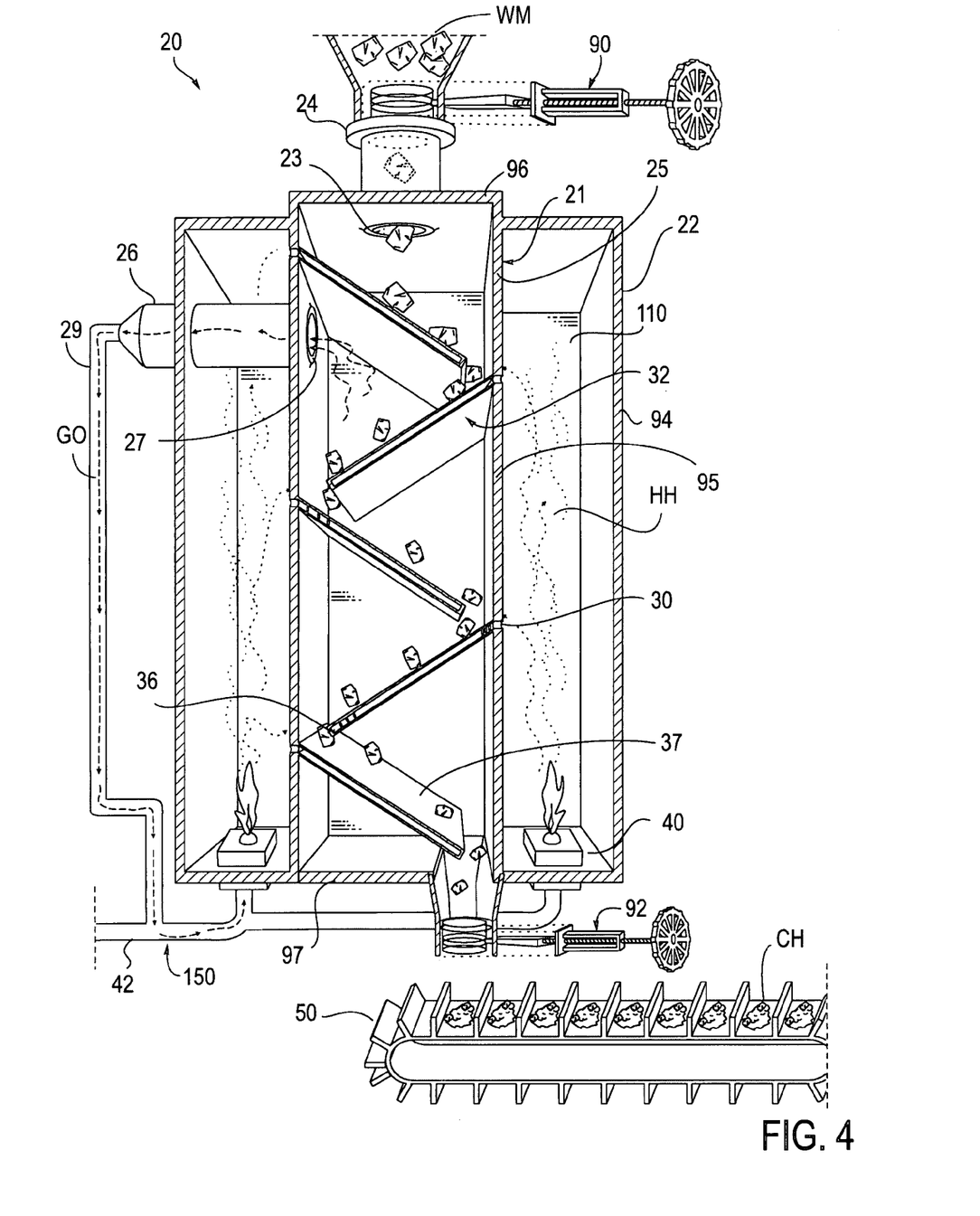
FIG. 4 is a frontal plan, sectional view depicting a second embodiment of the oven in FIG. 1.
Figure 5:
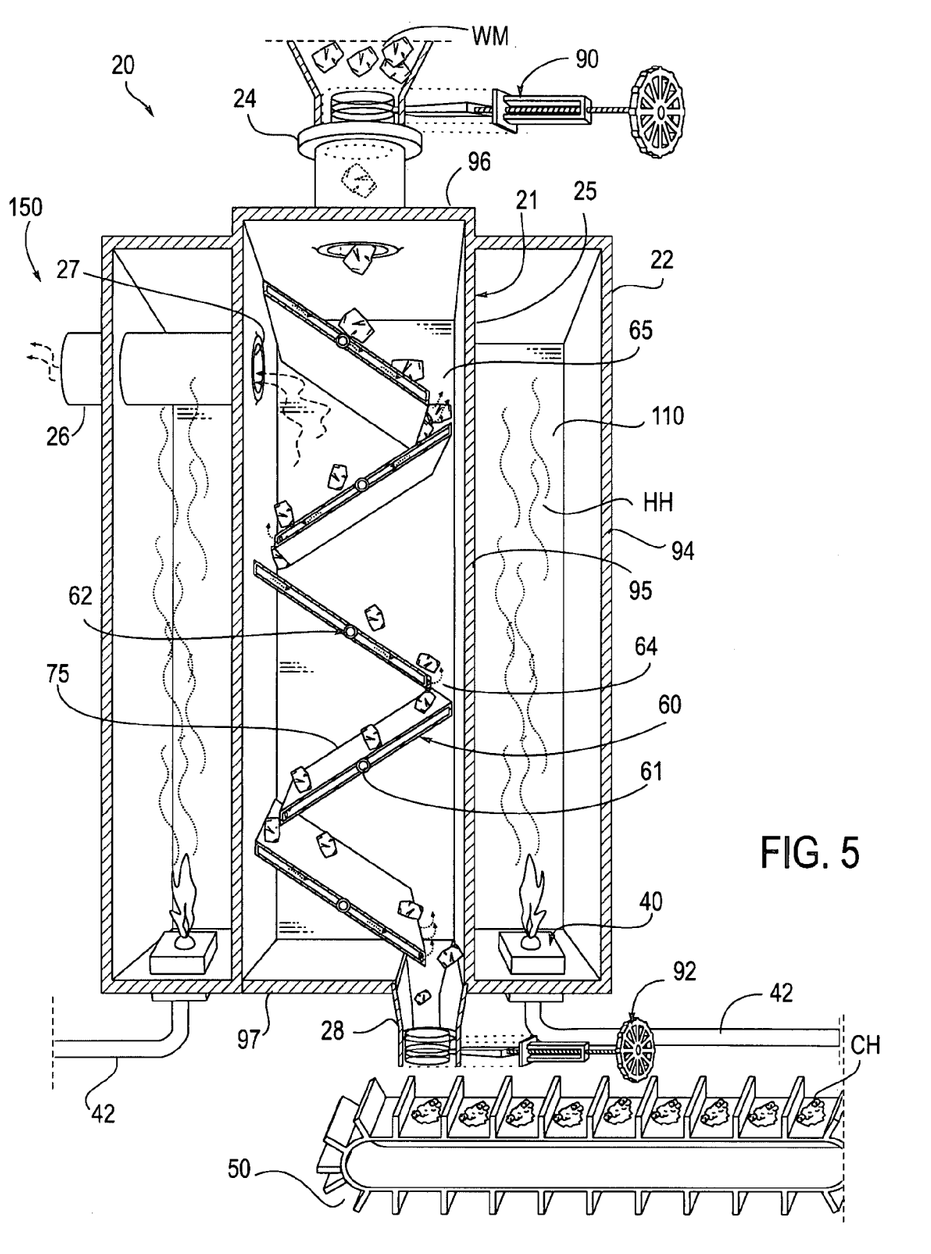
FIG. 5 is a frontal plan, sectional view depicting a third embodiment of the oven in FIG. 1.
Figure 6:
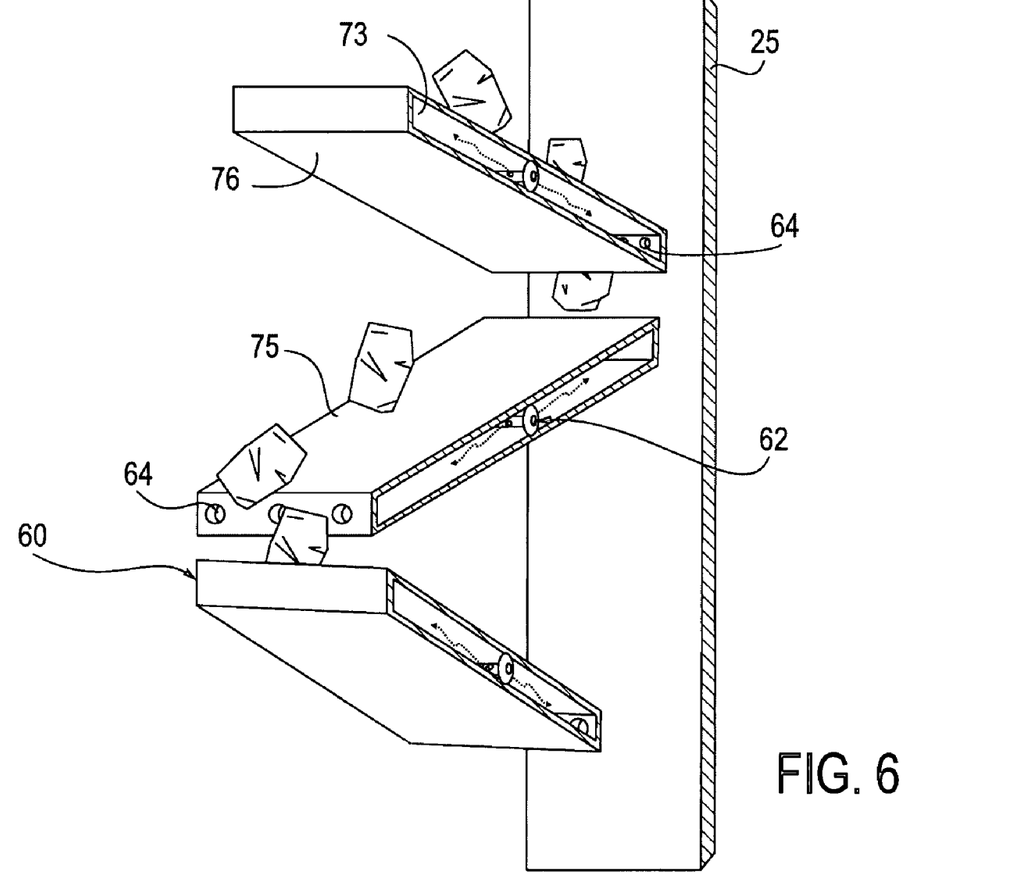
FIG. 6 is a perspective sectional view of adjacent plates shown in FIG. 5.
Figure 7:
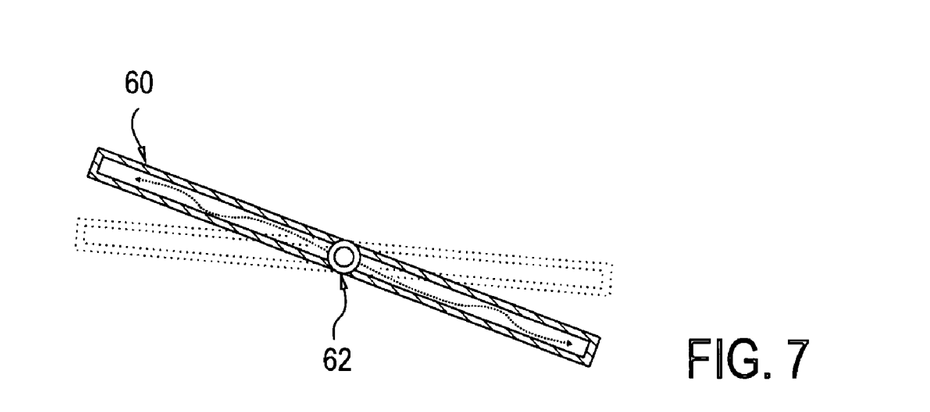
FIG. 7 is a frontal perspective view of a plate shown in FIG. 5 depicting a pivot action.
Figure 8:
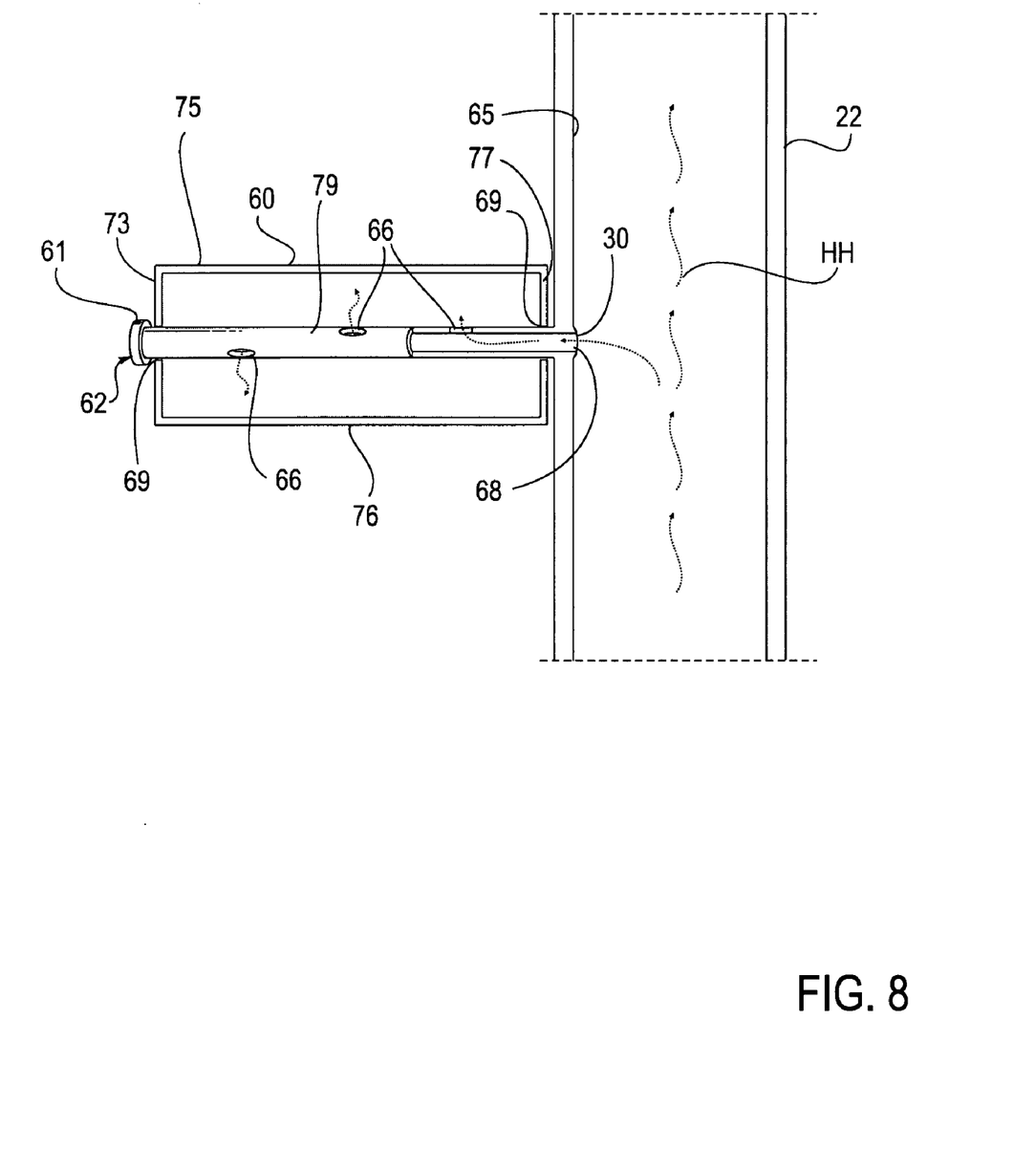
FIG. 8 is an end cross-sectional view of a plate shown in FIG. 5.

With reference to FIG. 4, a second preferred embodiment is shown, similar to the embodiment shown in FIGS. 1-3 except that, the gas discharge line 29 connected to conduit 26 is connected directly back into the heat source fuel line 42.

It will be appreciated that the second embodiment is particularly adapted to recycling potential environmental pollutant gases given off during the incineration of waste material WM and to optimizing fuel consumption. In operation, the second embodiment functions similar to the embodiment showed in FIGS. 1-3, however, as the potentially pollutant gas off GO rises up through the reaction vessel 21 to the outlet 27 and into the gas discharge conduit 26 because of lower pressure created by the cooler exterior outside the heating shell 22 and induced draft fan 150, the gas discharge GO flows down the gas line discharge 29 in operative connection with a fuel line 42 for supplementing a gas fuel source flowing into the heat source 40.

Those ordinary skill in the art will also appreciate that the oven 20 is may be modified to manipulate the retention time of material freefalling through the reaction vessel. In a third embodiment, referring to FIGS. 5-8, an oven 20 is similar to the oven shown in FIG. 1 except that the heat transfer plates 60 are mounted adjustably hinged to the reaction vessel 21 rear wall 65 to variably tilt downward depending on the thermal conversion requirements of the particular waste material being charred. The heat transfer plates 60 are once again typically flat, rectangular hollow plates with solid top 75, bottom 76, front side 73, and rear side 77 surfaces, and made from a high heat conductive and resilient material. In this embodiment, the plates 60 include openings 64 positioned typically on the plate end tilted downward and further include a hinge bolt 62 mounted intermediately along the length of the heat transfer plate 62 through bores 69 located on the forward facing wall 73 and rear facing side wall 77 hingedly connecting the heat transfer plates 62 to the reaction vessel rear wall 65. The hinge bolt 62 is constructed to include a hollow passageway 68 formed along the bolt shaft 79 operatively coupled to thermal ports 30 on one end and terminating in a solid bolt end 61 on the outer end. The bolt shaft 79 further includes openings 66 positioned along the length of the shaft.

If it will be recognized by those of ordinary skill in the art that different materials converted within the oven will require varying retention time for effective incineration. It will be appreciated that the present embodiment is particularly adaptable for adjusting the retention time of various material falling through the oven by controlling and adjusting the path the material traverses. Those skilled in the art will recognize for example, that by manipulating the angles of decline for each individual plate, the number of plates used, the initial frictional coefficient of the plate surface combined with the built up frictional coefficient of incinerated material on the plate, the vertical length of the oven, and the total true unobstructed freefall time of the material will produce a retention time efficient for converting material into char and gases through one pass within the oven. One such factor easily adjusted to regulate incineration efficiency is the plate angle.

It will be appreciated that by connecting the heat transfer plates 60 (FIG. 5), to the chamber rear wall 65 by means of adjustable hinge bolt 62, fast falling material such as medical syringes may have individual plates positioned in a shallower angle to reduce the rate of sliding along the top surface 75. On the other hand, waste material such as vulcanized rubber which tends to stick to surfaces as it melts may have individual plate angles steepened. In operation, heat energy HH formed between the heating shell 22 and reaction vessel wall 25 will flow into the slightly cooler and lower pressure area of the reaction vessel through the hollow passage way 68 of the bolt 62 and out through the bolt openings 66 into the length of the heat transfer plate hollow passageway heating the plate surfaces 73, 75 and 76 in the process. Heat flow will be enhanced once again by induced fans 150 connected to the gas discharge conduit 26 creating a reduced pressure beyond the reaction vessel 21 assisting the draw of heat energy HH into the reaction vessel through thermal ports 30 into the hollow bolt shaft 79 out bolt openings 66 into the heat transfer plate 60 interior and out plate openings 64 located at the plate's extremity heating the ambient air of the reaction vessel 21.

The operator of such ovens understands that increased retention time of material increases effective conversion and charring. However, the thoroughness of charring must be balanced against the processing rate of material. To assist in controlling processing time, each plate may be angled independently of the others. By using plates whose angle may be individually adjusted, gross and fine changes to the fall rate of material can be accomplished by adjusting, for example, just one or two of the plates. In practice, an individual plate may be configured nearly perpendicular to the wall if the fall rate of material in that oven section requires considerable slowing or conversely, the plate angle can be configured steeply to speed up the fall rate. For example, if charred material builds up at certain points such as on plates near the bottom, then increasing the plate angle will assist in deterring path obstruction by encouraging movement toward the exit.

Figure 9:
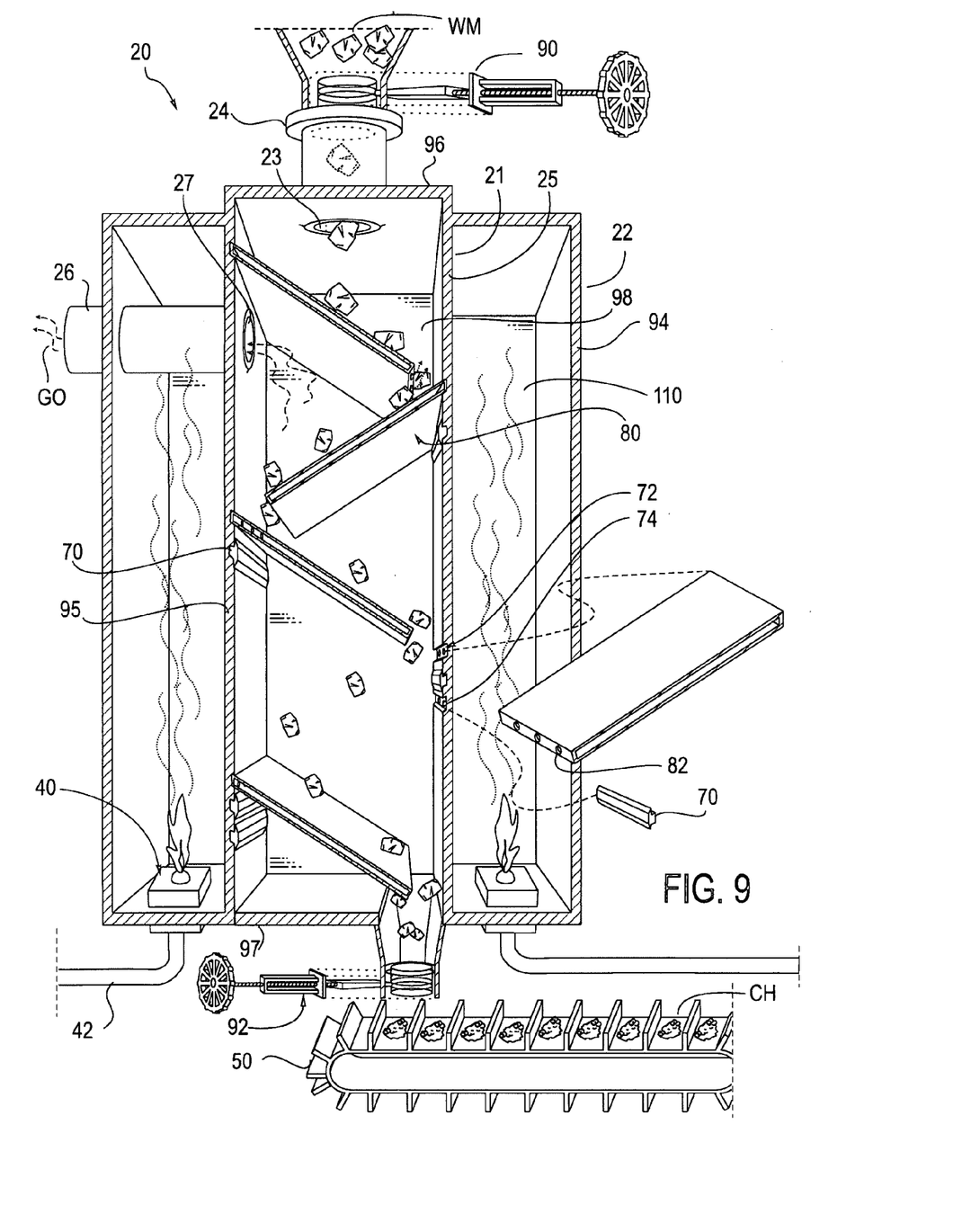
FIG. 9 is a frontal plan, sectional view depicting a fourth embodiment of the oven in FIG. 1.

A skilled artisan will also recognize that the workman may require a convenient means to install and remove plates as necessary to adjust the material fall path. For these instances, in a fourth embodiment, an oven 20 may be designed to slide heat transfer plates 80 in from the exterior through a removable surface 94 of the heating shell 22 and removable reaction vessel rear wall 98 or front reaction vessel wall (not shown) (FIG. 9). This embodiment is similar to the embodiment shown in FIG. 1 except that heat transfer plate 80 may be slid into a mounted position through slots 72 located in the side walls 25. The heat transfer plate 80 is similar to the heat transfer plates 32 and shown in FIG. 1 also incorporating solid top, bottom and side surfaces with a hollow interior and openings 82 on each plate end. The slots 72 incorporate thermal ports 74 that are aligned with thermal intake ports 82 on plates 80. Slot caps 70 are designed to cover slots 72 not supporting a heat transfer plate 80 during operation.

In operation, it will be recognized that this embodiment is also particularly adaptable for varying the waste material travel path through the reaction vessel 21. By including predetermined slots 72, the number of plates 80 and consequently the amount of freefall time is conveniently manipulated. Where slots are not currently used, slot covers 70 may fill their space controlling the heat flow into the chamber 21 and simultaneously protecting the slots from falling material buildup. When the heat source 40 generates a sufficient amount of heat energy HH the energy in the cavity 110, the heat energy rises and flows in through thermal ports 74 on the heating shell 22, plate openings 82 and flows through the hollow interior of the heat transfer plates 80 and out the plate opposite end into the reaction vessel 21 interior. As waste material enters through the airlocks 90 and inlet 24, the material begins incinerating on entering the reaction vessel 21 heated ambient air and is guided through the reaction vessel and further incinerated by contacting alternating and downwardly projecting mounted heat transfer plates 80 until the charred waste material CH falls off the last heat transfer plate 80 and is released out the air lock 82 on to a conveyor 50.

Those skilled in the art will appreciate that by way of using natural gravity in combination with heated obstruction plates, the inventors have created a pyrolytic oven chamber that efficiently thermally converts material without the need for several moving parts thus providing a more reliable, less maintained, and improved cost efficient system for disposing material. Furthermore, by coupling this freefall pyrolytic oven with an oxidation chamber, a self-contained system that can recycle the by-products of the oven into its own fuel energy for near 100% waste recycling is achieved. Therefore, those skilled in the art will appreciate that an oven and system has been invented that will provide an economical and environmentally friendly solution to the ever increasing problem of waste management.

Those of ordinary skill in the art will appreciate that minor modifications and alterations will be possible without deviating from the scope of the invention, and said modifications and alterations are intended to be included in the scope of the invention.

We claim:

1. A vertical retort oven for thermal conversion of material, comprising:
   a heating shell chamber including an interior wall surface;
   a reaction vessel including an exterior wall surface and an interior having an interior wall surface and positioned within the heating shell to define a cavity formed between the heating shell interior wall surface and the reaction vessel exterior wall surface, the reaction vessel further including an inlet;
   a plurality of plates positioned within the reaction vessel interior to direct the freefall of material from the inlet through the reaction vessel interior;
   a heat source positioned within the cavity; and
   means for transmitting heat from the heat source to the reaction vessel interior;
   wherein:
   the plates have a mounted end and have an opening at the mounted end, and the reaction vessel includes thermal energy ports disposed in alignment with openings on the mounted plate ends;
   the reaction vessel includes a gas exit coupled to a gas discharge conduit configured to project outward from the gas exit, through a cavity between the reaction vessel and the heating shell, and through the surface wall of the heating shell;
   the gas discharge conduit further comprises a pipe leading back into the heat source for supplying the heat source with the gas expelled by the oven through the gas exit;
   the plates are arranged vertically in overlapping succession and positioned to direct materials from one plate to succeeding lower plates;
   the plates are mounted adjustably hinged to the reaction vessel interior wall surface; and
   a bolt hinge including a first closed end, a second open end and a hollow shaft, the shaft including bores positioned along the shaft, the bolt hinge pivotally connecting respective plates to the reaction vessel interior wall surface and configured to permit heat from the heating shell to travel through the bolt open-end and through the shaft into respective plates.

2. A system of processing material through thermal conversion and combustion, comprising;
   a vertical retort oven including a reaction vessel with at least one interior wall surface defining a reaction vessel interior, an inlet, and a material exit, the reaction vessel housed at least partially within a heating shell forming a cavity therebetween, a heat source positioned within the cavity for heating the cavity and reaction vessel interior, a series of plates mounted to the reaction vessel interior wall surface and positioned to angle downwardly and inwardly therefrom to thermally convert the material dropped in through the inlet whereby entering the reaction vessel interior and contacting the plates thermally converts the material resulting in char and gases, the plates configured to direct the char to the material exit, a gas outlet positioned on the reaction vessel interior wall surface and coupled to a pipe configured to project out of the heating shell for expulsion of gas;
   a thermal oxidation chamber comprising a gas entrance and a burner for the combustion of gases expulsed from the vertical retort oven; and
   a gas discharge conduit coupled to the pipe between the vertical retort oven gas outlet and the thermal oxidation chamber gas entrance whereby the gases produced from thermal conversion of material in the vertical retort oven are communicated into the thermal oxidation chamber through the conduit;
   wherein the reaction vessel interior wall surface includes a plurality of slots each adapted to receive a respective plate, whereby the plates may be selectively spaced within the reaction vessel interior; and
   the system includes slot covers for covering slots into which plates have not been inserted.

3. The system for processing material of claim 2, wherein: the thermal oxidation chamber is set at a lower pressure in the system than the vertical retort oven.

4. The system for processing material of claim 2, wherein: the thermal oxidation chamber is cyclonic.

5. The system for processing material of claim 2, further comprising:
   a secondary heat source line;
   a heat exhaust port on the oxidation chamber coupled to a first end of the secondary heat source line;
   a secondary heat source port formed through the walls of the heating shell coupled to a second end of the secondary heat source line whereby a secondary heat source for the vertical retort oven is formed from a heat expelled from the combustion of gases within the thermal oxidation chamber.

6. The system for processing material of claim 2, wherein: a reaction vessel interior is maintained within a vacuum environment.

7. The system for processing material of claim 2, further comprising:
   a condenser in operative connection to the pipe wherein the gases are removed from the oven and condensed into oils in the condenser.

8. A vertical retort oven for thermal conversion of material, comprising:
   a heating shell chamber including an interior wall surface;
   a reaction vessel including an exterior wall surface and an interior having an interior wall surface and positioned within the heating shell to define a cavity formed between the heating shell interior wall surface and the reaction vessel exterior wall surface, the reaction vessel further including an inlet;

a plurality of plates positioned within the reaction vessel interior to direct the freefall of material from the inlet through the reaction vessel interior;

a heat source positioned within the cavity; and means for transmitting heat from the heat source to the reaction vessel interior;

wherein:

the plates are mounted adjustably hinged to the reaction vessel interior wall surface; and the oven further comprising bolt hinges pivotally connecting respective plates to the reaction vessel interior wall surface.

9. A vertical retort oven for thermal conversion of material as defined in claim 8, wherein the bolt hinges each include a first closed end, a second open end and a hollow shaft, the shaft including bores positioned along the shaft, the bolt hinges configured to permit heat from the heating shell to travel through the bolt open-end and through the shaft into a respective plate.

* * * * *